C. R. DAVIS.
HAY LOADER.
APPLICATION FILED FEB. 5, 1918.

1,315,819.  Patented Sept. 9, 1919.
2 SHEETS—SHEET 1.

Fig. 1.

Inventor:
Calvin R. Davis
by Ira J. Wilson
Atty.

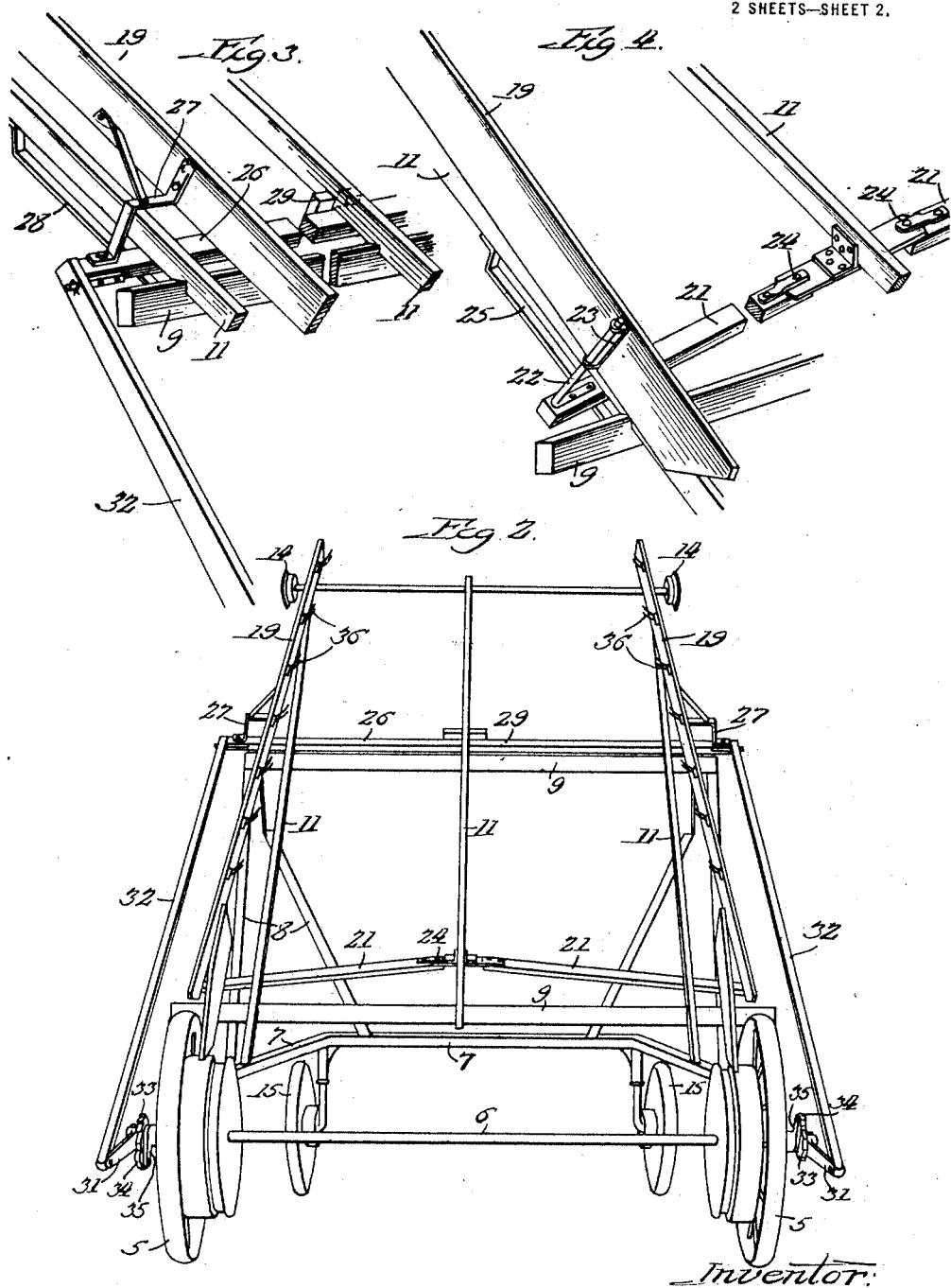

UNITED STATES PATENT OFFICE.

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

HAY-LOADER.

1,315,819.

Specification of Letters Patent.   Patented Sept. 9, 1919.

Application filed February 5, 1918.   Serial No. 215,491.

*To all whom it may concern:*

Be it known that I, CALVIN R. DAVIS, a citizen of the United States, residing at Rockford, in the county of Winnebago and State of Illinois, have invented certain new and useful Improvements in Hay-Loaders, of which the following is a specification.

This invention relates in general to hay loaders adapted to be drawn behind a hay rack for gathering hay from the ground and elevating and delivering it onto the rack. It is common practice to elevate the hay along an inclined bed or carrier-way, from the top of which the hay is delivered or falls onto the rack or wagon. Various types of mechanisms are employed for gathering and elevating the hay, such for example as reciprocating rake bars embodied in what are commonly known as "rake-bar" loaders, and endless carriers trained over cylindrical rake heads, as in the "cylinder" type loaders. In such loaders side boards define the sides of the carrier-way and converge at their upper ends to provide a contracted delivery end so that the hay will be brought together more compactly on the elevating means and delivered onto the center of the load. Because of this construction, the hay, crowded inwardly as it is elevated, often banks against the side boards and piles up on the elevator platform so as to clog and finally stop the operation. This invariably happens when the hay is heavy, and the stoppage must be cleared before the loading can be resumed.

The principal object of the present invention is to remedy this defect, that is, to provide means for preventing clogging or banking of hay on the inclined elevating platform, incidental to the presence of stationary converging side boards, and to insure proper elevation of the hay under all conditions of operation. This I have accomplished in the present instance by equipping the side boards with inwardly projecting hay teeth and providing means for reciprocating the side boards longitudinally so that upon each upward stroke thereof the hay will be actually lifted or elevated thereby and thus positively prevented from clogging on the elevating platform under any exigency of operation.

I have also aimed to provide simple and practical means for effecting this object, this means being chiefly exemplified by the employment of cranks operated by the drive traction wheels for reciprocating the side boards.

Referring to the drawings,—

Figure 1 is a rear quarter view in perspective, of a cylinder type hay loader embodying my improvements;

Fig. 2, a rear elevation of the loader, omitting the compressor and parts of the cylinder and elevating carrier; and Figs. 3 and 4, fragmentary perspective views of the operating and guiding means for the upper and lower ends respectively, of the side boards.

It will be noted, from the drawings that I have illustrated in detail only such parts of a hay loader as are necessary for a clear understanding of the present improvements, and in other respects any suitable construction may be followed. While my improvements are equally well adapted for hay loaders of the rake bar type, I have illustrated the present embodiment in connection with a cylinder loader, other features of which are described in my companion application Serial No. 222,398.

Hay loaders of this type generally comprise traction wheels 5 supporting an axle 6 which need not necessarily be a through axle, a frame of general triangular shape including base members 7 supporting through the agency of uprights 8 and cross bars 9, a series of inclined beams 11 defining in general the carrier-way, bed or elevating platform, and an endless elevating carrier designated in general by reference character 12, trained over a rake cylinder 13 co-axial with the traction wheels and over idler pulleys 14 secured to the upper end of the elevating platform. In the present instance, the frame is supported at its fore-end by dirigible carrying wheels 15, and the elevator is of the well known endless chain and transverse slat type. The construction of the rake cylinder is not shown as it has no direct bearing on the subject matter of this case. The compressor, designated in general by reference character 16, is of a full-floating type, and being of novel construction, is fully described in my copending application mentioned above. It might be mentioned, however, that the upper and lower ends of the compressor are suspended through the agency of the spring elements 17 and 18 respectively, which allow a very large range of flexibility so that the compressor will function perfectly under all exigencies of service.

Coming now to my improvements, it will be noted that the loader is provided with side boards 19, which in general appearance and arrangement resemble the side boards found on any ordinary hay loader. That is to say, the side boards define the sides of the carrier-way and are arranged to converge upwardly, so that the delivery end of the elevator will be considerably narrower than its receiving end. As a consequence, the hay as it is elevated will be crowded inwardly by the side boards and delivered centrally onto the rack in front of the loader. Instead however, of providing stationary side boards, my invention contemplates the provision of means at the sides of the principal elevating means for not only performing the function of the old stationary side boards but of serving in addition to actually elevating the hay along the side of the elevator platform so as to assist in elevating the hay as a whole and to prevent clogging and banking of the hay, especially when the same is heavy and is being elevated in large quantities. In the present embodiment of my improvements, single side boards are employed. They are pivotally attached adjacent to the lower ends to oscillating bars 21 through the agency of upright pivot bolts 22 attached to cleats 23 in turn fixed to the outer side of the side boards as plainly illustrated in Fig. 4, cotter pins passing through the pivot bolt 22 serving to hold the bracket 23 against lengthwise displacement. The oscillating bars 21 are respectively pivotally connected at their inner ends at 24 to a plate fixed to the central bar 11 and are guided at their outer ends between the underside of the adjacent frame bars 11 and the guide strips 25 secured to the bars 11 in spaced parallel relation therewith. The side boards are rigidly attached at a higher point to a cross bar 26 through the agency of suitable cleats 27. This cross-bar, disposed immediately beneath the elevator platform bars 11, is confined and slidable at its ends between the undersides of said bars and guide strips 28 secured to the bars similarly to the strips 25. The bar 26 carries a notched piece 29 for the reception of the central bar 11, so that the latter will serve as a guide to prevent longitudinal displacement of the cross-bar during the reception of the same in a direction parallel with the longitudinal axis of the elevator platform.

Means is now provided for moving the side boards back and forth lengthwise in the general plane of the elevator platform. It will be evident that the side bars are capable of such movement, since the cross-bar 26 may slide on the ways 28 and the bars 21 may oscillate so that instead of a strictly rectilinear movement being imparted to the lower end of the side boards, they will be moved in an arcuate path inwardly during the latter part of their elevating strokes and outwardly commencing their retracting strokes. The operating means consists of crank arms 31 adapted to be revolved by the traction wheels and respectively connected by a pitman 32 to the outer adjacent end of the cross-bar 26. In the present instance each crank is fixed directly on an outer end of the axle 6 and is provided with an integral ratchet wheel 33 adapted to be respectively driven from the adjacent traction wheel through the agency of a pawl 34 carried by an arm 35 which is secured to a sleeve revoluble in the axle bracket and fixed to the traction wheel. The pawls 34 which are held by suitable springs in driving connection with the toothed ratchet wheels 33 may be withdrawn from such engagement at will and held in inoperative position, so as not to operate the cranks 31 when the hay loader is simply being transported. It will be manifest that when the pawls 34 are engaged the cranks 31 will be revolved by the traction wheels and, through the agency of pitmen 32, will reciprocate the cross-bar 26 so as to move the side boards 19 back and forth lengthwise in the general longitudinal plane of the elevating platform. It will also be evident that this reciprocating movement of the side boards will be modified by the action of the oscillating bars 21 as mentioned above, there being sufficient flexibility in the side boards and in their connection with the cross bar 26 to permit of such modified movement.

Each side bar is equipped at spaced intervals throughout its length with inwardly and upwardly inclined hay teeth or tines 36 adapted to engage in the body of the hay for assisting in elevating the same upon the upward strokes of the side boards. These teeth or tines may be of any suitable construction, and in the present instance, are in the form of double tines pivotally secured to the side boards so as to be free to swing toward the latter and thus disengage from the hay during the retracting strokes, and are limited in their outward swinging movement so as to project at a proper working angle for engaging the hay on the upward strokes.

In operation, it is evident that the side boards will be continuously reciprocated and as the hay is elevated the side boards will crowd the same inwardly as it approaches the top of the elevating platform and at the same time will assist in elevating the hay so as to keep the same moving in a body and thereby absolutely prevent clogging or banking of the hay as very frequently occurs in the constructions now in use. In addition to assisting in elevating the hay more perfectly, I am enabled by means of these reciprocating side boards to elevate a larger quantity of hay with a given size loader than is possible with any previous loader, assuming of course, that the compressor is properly constructed for accommodating the large volume of hay. It follows, therefore, that the hay may be raked in a large windrow and elevated quickly without danger of stopping or clogging the machine, whereas with other loaders the windrows must be smaller and consequently a greater length of time is required for loading a given quantity.

It is believed that the objects prefaced above are fully described and illustrated by the foregoing, and it should be understood that while I have illustrated one working embodiment of my improvements, various changes might be made in the construction and arrangement without departing from the spirit and scope of the invention as expressed in the appended claims.

I claim:

1. In a hay loader, the combination with traction wheels and means driven thereby for elevating hay along an inclined carrier-way, of side boards for the carrier-way, and cranks operated by the traction wheels and connected with the side boards for reciprocating the same longitudinally.

2. In a hay loader, the combination with a main means for elevating hay along an inclined bed, of side boards flanking the bed and equipped with inwardly projecting hay teeth, and means for moving the side boards back and forth in unison in the general longitudinal plane of the bed, whereby the boards jointly assist the main means in feeding the hay upwardly thereon.

3. In a hay loader, the combination with means for elevating hay along an inclined bed, of side boards flanking the bed and equipped with inwardly projecting hay teeth, and means for moving the side boards back and forth in a general longitudinal plane of the bed for assisting in feeding the hay upwardly thereon and for moving the lower ends of the boards inwardly during their upward movement and outwardly during their retracting movement.

4. In a hay loader, the combination with means for elevating hay along an inclined bed, of side boards for the bed, means for reciprocating the side boards lengthwise, and links pivotally mounted intermediate the side boards and pivotally connected with the latter adjacent to their lower ends so as to modify the movement of the side boards when the latter are reciprocated.

5. In a hay loader, the combination with means for elevating hay along an inclined bed, of side boards for the bed, a transverse bar connected to and holding the side boards in spaced relation, means operating on said transverse bar for moving the side boards back and forth in the general longitudinal plane of the bed, and means for modifying said reciprocating movement by imparting a sidewise movement to the side boards during reciprocation thereof.

6. In a hay loader, the combination with means for elevating hay along an inclined bed, of side boards for the bed, means for moving the side boards lengthwise back and forth in the general longitudinal plane of the bed, and means for imparting sidewise movement to the side boards during lengthwise movement thereof.

7. In a hay loader, the combination with traction wheels, an inclined carrier-way and hay elevating means, of means providing upwardly converging sides for the carrier-way so that the hay will be crowded inwardly as it is being elevated along said carrier-way and will be delivered through the narrow restricted upper end, said side means being provided with inwardly directed hay teeth, and means operated from the traction wheels for moving said hay-teeth carrying means in a direction common with that of the hay elevating means so as to assist in elevating the hay.

8. In a hayloader, the combination of an inclined carrier-way along which the hay is adapted to be elevated, an endless elevator movable along said carrier-way for elevating the hay, sideboards defining the sides of the carrier-way and equipped on their inner sides with hay teeth, and means for imparting back and forth lengthwise movements to the sideboards, which during their upward movement will approach the center of the carrier-way and on the return movement will recede therefrom.

9. In a hayloader, the combination of means for elevating hay along an inclined bed, sideboards for the bed equipped at their inner sides with hay teeth, and means for reciprocating the sideboards longitudinally and for causing the sideboards during their elevating stroke to be given a movement inwardly toward the center of the carrier-way.

10. In a hayloader, the combination of means for elevating hay along an inclined bed, sideboards for the bed tied together at their upper ends, means for reciprocating the sideboards longitudinally of the bed, and means for moving the lower ends of the sideboards inwardly of the bed during the upward stroke and outwardly during the downward or return stroke.

11. In a hay loader, the combination of a wheeled frame providing an upwardly and forwardly inclined bed, means movable over the bed for elevating hay, a sideboard at each side of the bed defining the sides of the hay carrier-way and capable of back and forth movement lengthwise of the bed, the sideboards being equipped on their inner sides at longitudinally spaced intervals with teeth, and means for alternately moving both sideboards upwardly and downwardly lengthwise of the bed during operation of the main elevating means for elevating the hay in conjunction therewith.

12. In a hayloader having an inclined bed, the combination of a main elevating means for elevating hay upon said bed, an upright sideboard extending longitudinally of the bed at each side thereof and defining the side of the carrier-way, hay teeth on the inner side of the sideboards, the sideboards being arranged to converge inwardly at their upper ends to provide a restricted delivery end, and means for simultaneously reciprocating the sideboards lengthwise of the carrier-way in their converging relation, whereby the sideboards will, on their up stroke, jointly and in conjunction with the main elevating means serve to positively elevate a body of hay and deliver it through said restricted delivery end.

13. A hayloader having an inclined bed and a main means for elevating hay along said bed, sideboards for the bed equipped with hay teeth, a connection between the sideboards through the means of which reciprocatory movement may be imparted to the sideboards lengthwise of the bed for assisting in elevating the hay, traction wheels for driving said main elevating means, and means operated by the traction wheels for reciprocating the sideboards simultaneously with the operation of the main elevating means.

14. A hayloader having an inclined bed and a main hay elevating means in coöperation therewith, sideboards for the bed equipped on their inner sides with hay teeth, means joining the sideboards adjacent to their upper ends for holding them in operative relation, means for guiding the sideboards to permit reciprocation thereof lengthwise of the inclined bed, traction wheels, a crank on each wheel, and a pitman between each crank and the adjacent sideboard for reciprocating the latter during forward movement of the hayloader.

CALVIN R. DAVIS.

Copies of this patent may be obtained for five cents each, by addressing the "Commissioner of Patents, Washington, D. C."